(12) United States Patent
Witte

(10) Patent No.: US 9,724,904 B2
(45) Date of Patent: Aug. 8, 2017

(54) METHOD AND SYSTEM FOR PRODUCING COMPOSITE COMPONENT

(71) Applicant: Airbus Operations GmbH, Hamburg (DE)

(72) Inventor: Tassilo Witte, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 258 days.

(21) Appl. No.: 14/549,981

(22) Filed: Nov. 21, 2014

(65) Prior Publication Data

US 2015/0151526 A1    Jun. 4, 2015

(30) Foreign Application Priority Data

Nov. 29, 2013   (EP) .................................. 13195189

(51) Int. Cl.
  *B29C 53/58*  (2006.01)
  *B32B 37/14*  (2006.01)
  (Continued)

(52) U.S. Cl.
  CPC .......... *B32B 37/142* (2013.01); *B29C 53/568* (2013.01); *B29C 53/582* (2013.01);
  (Continued)

(58) Field of Classification Search
  CPC ..... B29C 53/58; B29C 53/582; B29C 53/583; B29C 53/584; B29C 53/60; B29C 53/607;
  (Continued)

(56) References Cited

U.S. PATENT DOCUMENTS 2,822,575 A * 2/1958 De Vinzelles Pierre
  .............................. B29B 13/00
  156/185
4,673,541 A * 6/1987 Watanabe ............. B29C 53/582
  156/180
(Continued)

FOREIGN PATENT DOCUMENTS

DE    19813230 A1    9/1999
EP    1911911 A2    4/2008
(Continued)

OTHER PUBLICATIONS

European Patent Office, European Search Report for European Patent Application No. 13195189.9 mailed May 13, 2014.

*Primary Examiner* — Carson Gross
(74) *Attorney, Agent, or Firm* — Lorenz & Kopf, LLP

(57) ABSTRACT

A system is provided for producing components of composite material, and especially elongate or continuous components of fiber-reinforced polymer. The system comprises a winding mechanism for winding an elongate sheet of composite material about a winding axis that is at an angle to a perpendicular to a longitudinal axis of the elongate sheet so as to form a helical coil of wound sheet a mechanism is provided for drawing or conveying the helical coil of wound sheet along a process path, wherein the process path is preferably substantially parallel to the winding axis. A shaping mechanism forms or shapes the coil of wound sheet as it is drawn or conveyed along the process path. A corresponding method of producing a composite component is provided.

13 Claims, 3 Drawing Sheets

(51) Int. Cl.
| | |
|---|---|
| B29C 70/50 | (2006.01) |
| B29C 70/52 | (2006.01) |
| B29C 70/08 | (2006.01) |
| B29C 53/56 | (2006.01) |
| B64C 1/00 | (2006.01) |
| B64G 99/00 | (2009.01) |
| B65C 3/00 | (2006.01) |
| B29C 47/00 | (2006.01) |
| B29C 47/06 | (2006.01) |
| B29K 307/04 | (2006.01) |
| B29K 309/08 | (2006.01) |
| B29C 53/80 | (2006.01) |

(52) U.S. Cl.
CPC .......... *B29C 70/083* (2013.01); *B29C 70/504* (2013.01); *B29C 70/52* (2013.01); *B64C 1/00* (2013.01); *B64G 9/00* (2013.01); *B29C 47/0059* (2013.01); *B29C 47/0064* (2013.01); *B29C 47/065* (2013.01); *B29C 53/8058* (2013.01); *B29K 2277/10* (2013.01); *B29K 2307/04* (2013.01); *B29K 2309/08* (2013.01); *B32B 2605/18* (2013.01); *B64C 2001/0072* (2013.01); *B65C 3/00* (2013.01); *Y02T 50/433* (2013.01)

(58) Field of Classification Search
CPC .. B29C 53/72; B64C 1/00; B64C 1/06; B64C 1/061; B64C 1/064; B64C 1/065; B64C 2001/0072; B64C 3/00; B64C 3/18; B64C 3/182; B64C 3/185; B64C 3/187
USPC .................................................. 156/191, 194
See application file for complete search history.

(56) References Cited

U.S. PATENT DOCUMENTS

| 6,178,277 B1 | 1/2001 | Ravela et al. |
| 2010/0282904 A1 | 11/2010 | Kismarton et al. |

FOREIGN PATENT DOCUMENTS

| FR | 2856336 A1 | 12/2004 |
| WO | 9530532 A1 | 11/1995 |

\* cited by examiner

METHOD AND SYSTEM FOR PRODUCING COMPOSITE COMPONENT

CROSS-REFERENCE TO RELATED APPLICATIONS

This application claims benefit of and priority to the European Patent Application No. 13 195 189.9, filed Nov. 29, 2013, the entire disclosures of which is incorporated herein by way of reference.

TECHNICAL FIELD

The subject matter herein relates to a method and a system for producing components of composite material, and especially elongate or continuous components of fibre reinforced polymer or plastic.

BACKGROUND

The use of composite materials in the design and manufacture of aircraft and spacecraft is becoming increasingly prevalent due to the low-weight and relatively high-strength properties achievable with those materials, among which fibre-reinforced polymer composites, such as carbon fibre reinforced polymers (CFRP), are especially preferred. As fibre-reinforced polymer composite materials now find increasing application in modern aircraft and spacecraft production, efforts are being made to develop efficient and cost-effective techniques for producing such composite components.

Other objects, desirable features and characteristics will become apparent from the subsequent summary and detailed description, and the appended claims, taken in conjunction with the accompanying drawings and this background.

SUMMARY

In accordance with an embodiment, a new and improved method and system for producing components of composite material is provided. In this regard, it would be useful if the composite parts or components could be manufactured at lower production costs, and/or if the buy-to-fly ratio of components in the material acquisition chain were improved. In this manner, overall economy of production in fibre-reinforced polymer composites, such as CFRP, could be enhanced. It would be desirable, for example, to employ such a new and improved method and system to produce elongate composite components in the form of profile elements, such as gusset fillers, which do not require high strength or load-bearing capacity but are nevertheless important in the assembly of composite airframe structures. It will be appreciated, however, that the method and system described herein are not limited to the aircraft and aerospace industries, but may be used in a wide range of applications where fibre-reinforced polymer or plastic (FRP) composites are employed.

Accordingly there is provided a method for producing a component of composite material, such as an elongate or continuous component of a fibre-reinforced polymer, comprising: winding an elongate sheet of composite material about a winding axis that extends at an angle that is non-normal or non-perpendicular to a longitudinal axis of the elongate sheet so as to wind the sheet into a helical coil; drawing or conveying the helical coil of wound sheet along a process path that is preferably generally parallel to the winding axis; and forming or shaping the coil of wound sheet as it is drawn or conveyed along the process path, i.e. providing or imparting a predetermined cross-section or profile.

It will be appreciated that, by arranging the winding axis so that it is skewed or offset at an angle (i.e. an acute angle, preferably less than or equal to about 60°, more preferably less than or equal to about 45°, most preferably less than or equal to about 30°) from the perpendicular to a longitudinal axis of the elongate sheet, the winding process gives rise to helical coiling of that elongate sheet or strip of composite material. In this way, the winding itself may contribute to the step of conveying the wound sheet along the process path.

In a further embodiment, the method includes: providing the elongate sheet of composite material on a roll; and drawing the elongate sheet from the roll towards the winding axis in a direction of a longitudinal axis of the sheet. The elongate sheet of composite material preferably comprises reinforcing fibres, i.e. in the form of a woven or non-woven fabric. The fibres may have either an oriented (i.e. ordered) arrangement in the sheet, as is typical with long or "endless" fibres, or a non-oriented (i.e. disordered or random) arrangement in the sheet, as is typical with short fibres. In a preferred form, the sheet comprises the reinforcing fibres in a polymer matrix. The polymer matrix material is typically a polymer resin (usually a thermosetting resin) and may be selected from the group consisting of epoxy, polyester, vinyl ester, and nylon resins. As noted above, the fibre-reinforced wound sheet may include carbon fibres, glass fibres, and/or aramid fibres. Thus, in a preferred embodiment, the sheet may be provided as a sheet molding compound (SMC) or resin pre-impregnated fibre sheet (i.e. a "prepreg" sheet). In an alternative form, however, if the sheet could be provided as a "dry" fibre sheet and then subsequently impregnated with resin.

An advantage of this is that composite components, and especially elongate fibre-reinforced polymer (FRP) components, can be produced on a continuous basis using relatively inexpensive starting materials such as sheet material having only short fibres and/or random fibre orientation. In regard to the production of gusset fillers, this contrasts starkly with the relatively high material and process costs of current production techniques that employ press-forming stacks of uni-directional prepreg sheets.

In a further embodiment, the method comprises wrapping or enveloping the coil of wound sheet with a support sheet or reinforcing sheet as it is drawn or conveyed along the process path. In this regard, the support sheet or reinforcing sheet may include reinforcing fibres that are preferably arranged to extend either substantially parallel to the process path or at an acute angle to the process path. In this way, although the wound sheet may comprise only short fibres in a non-oriented or random array and not exhibit good tensile strength or tear resistance, fibres of the support sheet or reinforcing sheet can impart the required tensile strength and tear resistance to the coil of wound sheet as it is drawn and processed along the path. The support sheet or reinforcing sheet may comprise a fibre-reinforced polymer film, (i.e. to act as a release film) or could be a prepreg. In a preferred embodiment, the method includes providing a roll of the support sheet and arranging that roll such that a central axis of the roll extends substantially perpendicularly to the process path along which the wound sheet is drawn or conveyed. As the support sheet is unwound from that roll in a direction of the process path, it can be wrapped around the elongate or continuous coil of wound sheet.

In another embodiment, the step of forming or shaping the coil of wound sheet, i.e. optionally wrapped or enveloped by a support sheet or a reinforcing sheet, comprises drawing or conveying the wound sheet through a shaping mechanism. The shaping mechanism typically includes at least one roller to engage and press sides of the coil of wound sheet to form a predetermined cross-section or profile of the coil, and/or a forming die through which the wound sheet may be extruded or "pultruded". Thus, the method includes engaging and pressing one or more sides of the coil of wound sheet with a roller, and/or extruding or pultruding the wound sheet through a die.

In a further embodiment, the step of forming or shaping the coil of wound sheet includes clamping and/or pressing the wound sheet in a molding tool. The molding tool typically includes a plurality of mold parts that may be movable between an open position for receiving the coil of wound sheet and a closed position for pressing or shaping that coil. The mold parts may thus be configured to clamp or to press a section of the wound sheet there between. Further, the molding tool is preferably movable to draw or pull the coil of wound sheet along the process path. In this way, the molding tool forms at least part of a mechanism for drawing or conveying the coil of wound sheet along the process path.

In a further embodiment, the method further includes at least partially curing the coil of wound sheet; i.e. optionally wrapped with or enveloped by a support sheet or a reinforcing sheet, after it has been formed or shaped to the predetermined cross-section or profile. In this regard, the curing step preferably occurs in the molding tool and at a temperature in the range of 60° C. to 200° C., preferably in the range of 80° C. to 180° C., and more preferably in the range of 120° C. to 160° C.

Also provided is a system for producing components from composite material, and especially an elongate or continuous component from a fibre-reinforced polymer, comprising: a winding mechanism for winding an elongate sheet of composite material about a winding axis that is offset by an angle (i.e. an acute angle) from a normal or perpendicular to a longitudinal axis of the elongate sheet to thereby form a helical coil of wound sheet; a mechanism for drawing or conveying the helical coil of wound sheet along a process path that is preferably substantially parallel to the winding axis; and a shaping mechanism for forming or shaping the coil of wound sheet as it is drawn or conveyed on the process path.

In a further embodiment, the elongate sheet is provided on a roll and is drawn from the roll in a direction of its longitudinal axis towards the winding axis. A central axis of the roll is arranged to extend at the said angle to the winding axis.

In a further embodiment, the shaping mechanism includes: one or more rollers configured to engage and/or to press sides of the coil of wound sheet to form a desired or predetermined cross-section or profile of the component, and/or a forming die through which the coil of wound sheet is configured to be extruded or "pultruded" to form the desired or predetermined cross-section or profile.

In a further embodiment, the shaping mechanism includes a molding tool that is movable between an open position for receiving the coil of wound sheet and a closed position for shaping the wound sheet. The molding tool may therefore comprise a plurality of mold parts configured to clamp and/or press a section of the wound sheet between them to form the predetermined cross-section or profile. Further, the molding tool may be movable to draw or pull the coil along the process path, such that the molding tool forms a part of the drawing or conveying mechanism.

In another embodiment, the system further comprises a film applicator device configured to apply a film layer from a film roll to at least one side of the coil of wound sheet. The film layer may form a reinforcing layer to strengthen the wound sheet when it is drawn or conveyed along the process path. The film layer may also act as a release film to assist removal of the semi-finished product from the molding tool.

It will be appreciated that the method of producing an elongate or continuous component of fibre reinforced polymer may defer the shaping or forming step. In other words, the method may comprise just the steps of: winding an elongate sheet of composite material about a winding axis that is offset by an acute angle from being normal to the longitudinal axis of the sheet so as to wind the sheet into a helical coil; and then drawing or conveying the coil of wound sheet along a path that is preferably substantially parallel to the winding axis. In this way, an elongate or continuous semi-finished or intermediate product is produced, which may then be shaped or formed and cured in separate or later processing stages.

In a similar fashion, therefore, another simplified aspect of the embodiments provides a system for producing an elongate or continuous component of fibre reinforced polymer, comprising: a winding mechanism for winding an elongate sheet or strip of composite material about a winding axis that is at an acute angle to a normal or perpendicular to a longitudinal axis of the elongate sheet so as to form a helical coil of wound sheet; and a mechanism for drawing or conveying the helical coil of wound sheet along a process path, the process path preferably being substantially parallel to the winding axis.

Also provided is a component that is produced or fabricated by a method and/or system according to any one of the embodiments described above. Also provided is a vehicle, such as an aircraft or spacecraft, with an airframe or fuselage structure including at least one component, and preferably several, produced or fabricated by a method and/or system according to any of the embodiments described above.

BRIEF DESCRIPTION OF THE DRAWINGS

For a more complete understanding, exemplary embodiments are described in more detail in the following description with reference to the accompanying drawings, wherein like reference numerals designate like parts and in which.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

The accompanying drawings are included to provide a further understanding of the described embodiments and are incorporated in and constitute a part of this specification. The drawings illustrate particular embodiments and together with the description serve to explain the principles of the described embodiments. Other embodiments and many of the attendant advantages will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
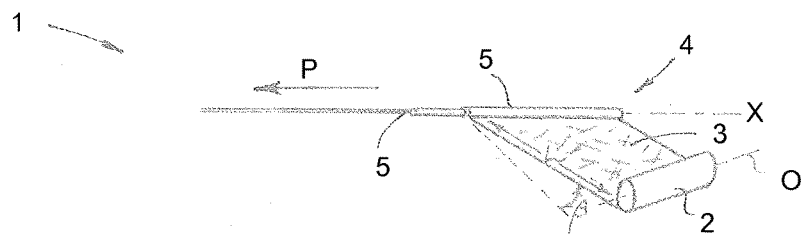
FIG. 1 is a schematic perspective illustration of part of a system and method according to a preferred embodiment.

With reference firstly to FIG. 1 of the drawings, part of a system 1 for producing elongate or continuous components C (FIG. 4) of a fibre-reinforced polymer (FRP) material is illustrated. In particular, FIG. 1 shows a roll 2 of an elongate sheet 3 of composite material provided as sheet molding compound (SMC). This SMC material comprises short, non-oriented (i.e. random or non-ordered) reinforcing fibres (e.g. of glass or carbon) embedded in a layer of uncured polymer resin. The elongate sheet 3 is extended from the roll 2 in a direction of its longitudinal axis L by rotating the roll 2 about its central axis O. The unwound strip or elongated expanse of the sheet material 3 is then wound via a mechanism 4 about a winding axis X which extends non-normal or non-perpendicular to the longitudinal direction or axis L of the elongate sheet 3. That is, the winding axis X is skewed or offset by an angle β from the perpendicular or normal to the longitudinal axis L of the sheet 3 that is unwound or drawn from the roll 2. As a consequence of this angled orientation of the winding axis X, when the elongate sheet 3 is wound about the axis X it forms a helical coil 5. As a result, the winding itself propagates or advances the coil 5 of wound sheet 3 in the direction of the winding axis X. As will become more apparent later in the description, movement of the elongate coil 5 of wound sheet 3 in this direction along or generally parallel to the winding axis X corresponds to a process path P of the system 1.

Because the sheet molding compound (SMC) of FIG. 1 comprises non-oriented short fibres in the non-cured polymer resin, the sheet 3 has a relatively low tear-strength. As a result, care must be taken when drawing or pulling the helical coil 5 of wound sheet 3 in the winding axis direction X to ensure that the elongate coil 5 does not inadvertently rupture or tear. To avoid such a tearing of the wound SMC sheet material 3, an embodiment contemplates the use of a support sheet 6 as shown in drawing FIG. 2. This support sheet 6 is provided as polymer film having a plurality of longitudinally extending reinforcing fibres 7, which are also shown schematically in the cross-sectional detail "D". By wrapping such a support sheet 6 around the helical coil 5 of wound sheet 3 so that the reinforcing fibres 7 extend essentially parallel to the winding axis X, the support sheet 6 reinforces the helical coil 5 of low-strength sheet 3 in the axial direction, as will be described in more detail shortly.

Figure 3:
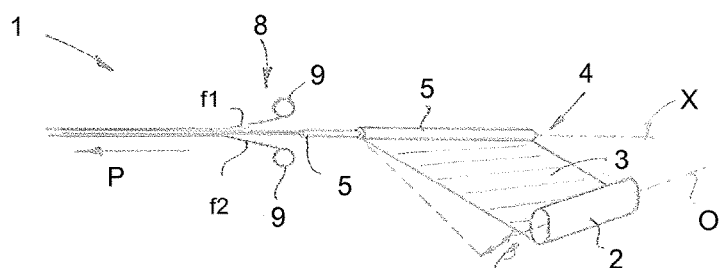
FIG. 3 is a schematic perspective illustration of part of a system and method according to another embodiment.

With reference to FIG. 3, the concept of winding an elongate sheet 3 of composite material around a winding axis X that is arranged angularly skewed or offset at an angle β is again illustrated. In this case, however, the sheet material 3 that is provided on the roll 2 comprises an oriented or ordered array of long fibres which endow the helical coil 5 of wound sheet with relatively high strength against unwanted tearing or rupture in the winding axis X direction. In this regard, when wound into a helical coil 5 via the winding mechanism 4, at least some of those long fibres may extend substantially parallel to the winding axis X or may follow a gradual helical path around the winding axis X at a low (i.e. acute) pitch angle. FIG. 3 also shows a film applicator device 8 arranged downstream from the winding mechanism 4 on process path P (i.e. in a direction along the winding axis X in which the helical coil 5 of wound sheet is propagated or conveyed).

The film applicator device 8 of this embodiment comprises two rolls 9 of polymer film or membrane $f_1$, $f_2$ and is configured to apply each of those films to respective upper and lower sides of the coil 5 of wound sheet 3. The film layers $f_1$, $f_2$ may act as support sheets 6 similar to the description with respect to drawing FIG. 2. Alternatively, or in addition, the film layers $f_1$, $f_2$ may each act as release films to prevent uncured resin matrix material from the wound sheet 3 adhering to a shaping mechanism 10 later in the system 1. The shaping mechanism 10 (FIG. 4) is configured to form or shape a profile or cross-section of the wound sheet 3 as will be described below.

Figure 4:
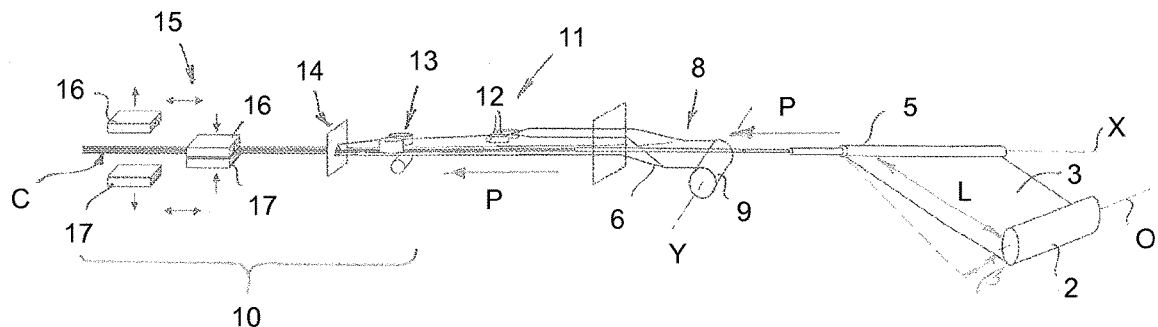
FIG. 4 is a schematic perspective illustration of a system according to a further embodiment.
Figure 5:
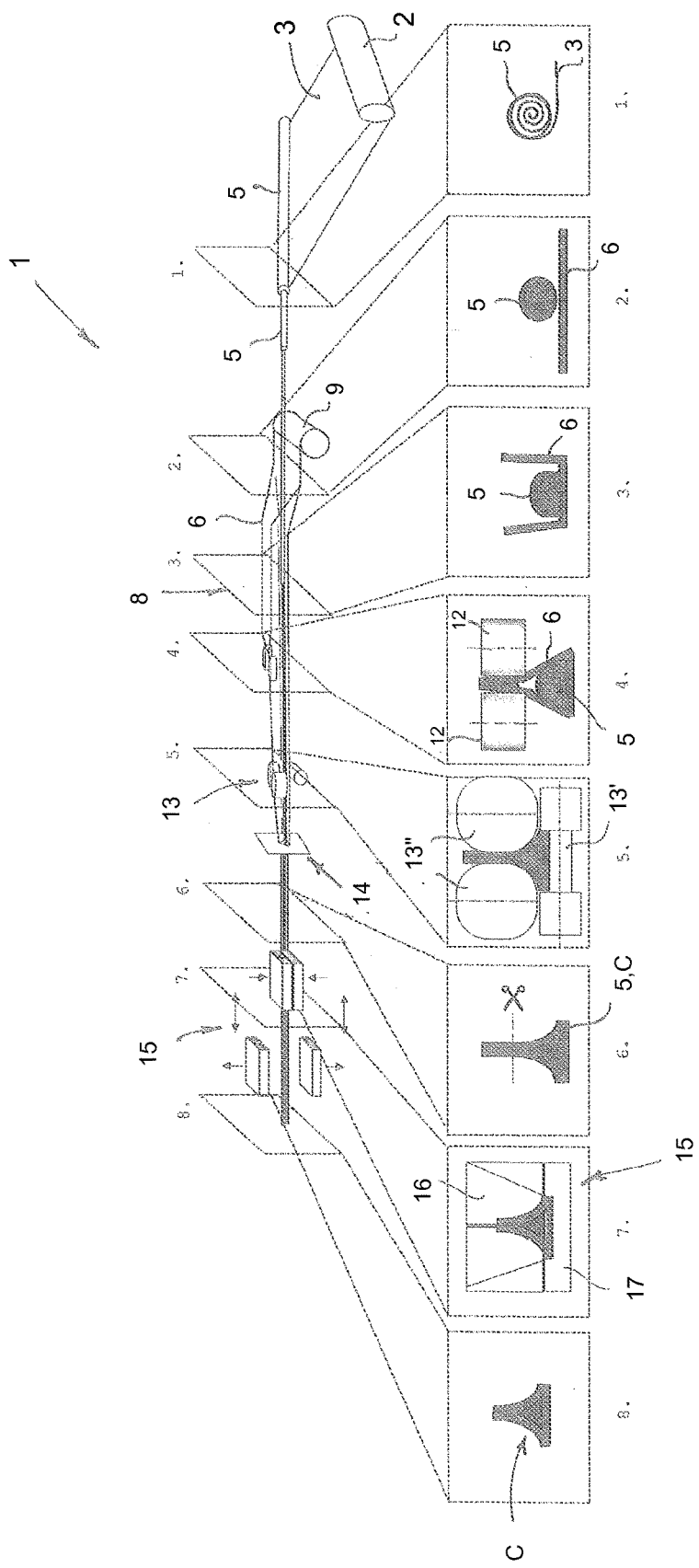
FIG. 5 is another illustration of the system and method of FIG. 4 including detail of particular stations or steps.

With reference now to FIG. 4 and FIG. 5, the system 1 according to a preferred embodiment and the operation of that system 1 will be described in more detail. In this connection, FIG. 5 specifically illustrates a series of cross-sectional images of the continuous coil 5 of composite material sheet 3 as it progresses along the process path P within the system 1. These images are consecutively numbered as stations 1 to 8 and will be referred to in turn in the following description.

The system 1 and methods associated therewith commences with the unwinding of the strip of SMC or prepreg sheet 3 from the roll 2 and the re-winding of that elongate sheet material 3 around an axis X (FIG. 1) that is offset or skewed by an angle β. This generates the helical coiling of the wound sheet 3 on the winding mechanism 4 as shown in the cross-sectional image at station 1 in FIG. 5. The continued winding about the axis X with winding mechanism 4 propagates or advances the helical coil 5 of sheet material 3 along the process path P. Furthermore, as will become clear, the system 1 also includes other mechanisms for drawing or conveying that helical coil 5 of wound sheet 3 along the process path P of the system 1, i.e. substantially parallel to the winding axis X.

As the helically coiled sheet 3 comprises reinforcing fibres and a matrix of uncured resin, when the sheet 3 is wound and coiled upon itself, and particularly when the coil 5 is drawn or conveyed along the process path P in the direction of the winding axis X, the layers of the wound sheet 3 tend to fuse and adhere to one another into a generally consistent mass of composite material. For this reason, the coiled nature of the wound sheet 3 is only clearly shown at station 1, with the cross-section of the coil 5 of wound sheet 3 otherwise being represented as a substantially solid cross-section in the remaining stations 2 to 8 of FIG. 5.

Figure 2:
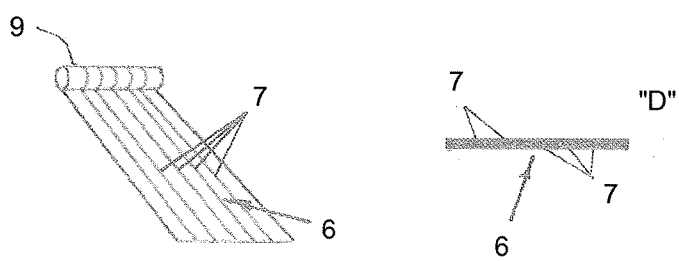
FIG. 2 is a schematic illustration of an example of fibre reinforced sheet material for use in the system and method of a preferred embodiment.

Stations 2, 3 and 4 of FIG. 5 illustrate a film applicator device 8 for applying and wrapping or enveloping the coil 5 of wound sheet 3 with a support sheet 6 similar to that shown in FIG. 2. The support sheet 6 is supplied on a roll 9 which is arranged such that a central axis Y (FIG. 4) of that roll 9 extends substantially perpendicular to the process path P along which the continuous coil 5 of wound sheet 3 is drawn or conveyed. In the image of station 2, it can be seen that the support sheet 6 is drawn from the roll 9 and introduced beneath the coil 5 of the wound sheet as it travels along the process path P. At station 3 the lateral edge regions of the support sheet 6 are folded upwards and around the coil 5 of wound sheet 3, and at station 4 the upwardly folded lateral edge regions of support sheet 6 are fused or bonded together between rollers 12 of a sealing device 11 (FIG. 4) to completely enclose or envelope the wound sheet coil 5 therein. The rollers 12 of the sealing device 11 may be driven to assist in propagating or conveying the helical coil 5 of wound sheet 3 generated at the winding mechanism 4. The support sheet 6 serves both to reinforce or strengthen the elongate coil 5 of wound sheet against rupture or tearing as it is drawn through system 1 and also contains the uncured pre-polymer resin and prevents its unwanted adherence to the other elements of the system 1. That is, this support sheet 6 may act as a release film to assist removal from the molding tool later in the system.

With reference now to stations 5 to 7 in FIG. 5, different elements or parts of the shaping mechanism 10 are apparent in this embodiment of the system 1. In particular, station 5 shows a plurality of rollers 13" and 13", specifically a lower roller 13' having a substantially horizontal roller axis transverse to the process path P and upper rollers 13" each on laterally opposite sides of the wound sheet 3 now wrapped or enveloped in the support sheet 6, each of the upper rollers 13" being configured to rotate about a own vertical axis Z. Each of the rollers 13' and 13" engages the enveloped and wound sheet 3 from different sides and presses that sheet material 3 to form or create a predetermined cross-section or profile transverse to the process path P. Downstream of the rollers 13, the shaping mechanism 10 further includes a forming die 14 (FIG. 4) through which the partially formed or shaped profile of the component C to be produced is then extruded or pultruded. At station 6, a cutting or trimming operation is then performed to remove an uppermost portion of the vertically extending flange from the cross-sectional profile of the component C (FIG. 4).

Station 7 in FIG. 5 illustrates a molding tool 15 of the shaping mechanism 10 into which the continuous and now almost completed component C is conveyed. The molding tool 15 has upper and lower mold parts 16 and 17 which close together in a vertical direction to receive and to clamp or press a section of the component C in a mold cavity there-between. A final shaping or forming of the desired or predetermined profile of the continuous component C being produced is thus provided by the molding tool 15. At the same time, the molding tool 15 can be moved in the axial downstream direction to also form part of the mechanism for drawing the helical coil 5 of wound sheet 3 along the process path P through the system 1. In addition, the upper and lower mold parts 16 and 17 may be heated (e.g. to a temperature in the range of about 60° C. to 200° C.) to perform at least partial curing of the section of the component C enclosed within the mold cavity during this clamping or pressing phase. After the clamping and (at least partial) curing phase is complete, the upper and lower mold parts 16 and 17 are separated, as shown downstream of station 7. to release the section of the continuous component C produced by the system 1 now having the desired transverse profile or cross-section as shown at station 8, e.g. of a gusset filler to be used in airframe structures. The separated mold parts 16 and 17 are then moved back upstream of the process path to receive and clamp the next section of the elongate composite material to undergo final shaping and curing in the molding tool 15.

Figure 6:
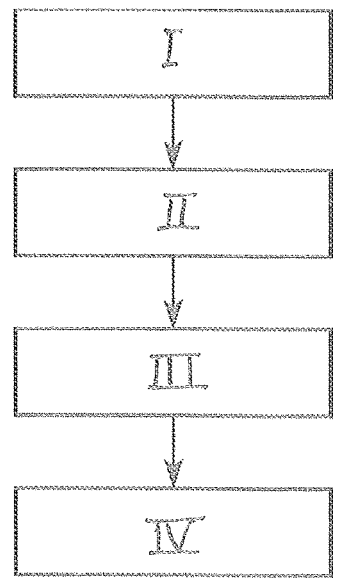
FIG. 6 is a flow diagram that schematically illustrates a method according to a preferred embodiment.

Referring now to FIG. 6 of the drawings, a flow diagram is shown that schematically illustrates the steps in a method of forming the component C according to the embodiments described above with respect to FIGS. 1 to 5. In this regard, the first box (I) of FIG. 6 represents the step of winding the SMC strip or elongate prepreg sheet 3 from the roll 2 around a winding axis X such that the sheet 3 is wound helically into a coil 5. To this end, the winding axis X is arranged skewed or offset by an angle β from being normal or perpendicular to a longitudinal axis L of the sheet 3. The second box (II) represents the step of drawing or conveying the helical coil 5 of wound sheet 3 along the process path P of the system 1, which is typically generally parallel to the winding axis X. The third box (III) represents the step of forming or shaping the coil of wound sheet 3 to provide the desired or predetermined cross-section or profile as the wound sheet is drawn or conveyed along the process path P. In this regard, the forming or shaping step may include any one or more of forming rollers 9, a forming die 14, or a molding tool 15. The fourth box (IV) in FIG. 6 then represents the step of at least partially curing the wound sheet 3 after it has been formed or shaped with the predetermined cross-section or profile. This curing step desirably occurs within a molding tool 15 and typically takes place at a temperature in the range of about 60° C. to about 200° C.

Figure 7:
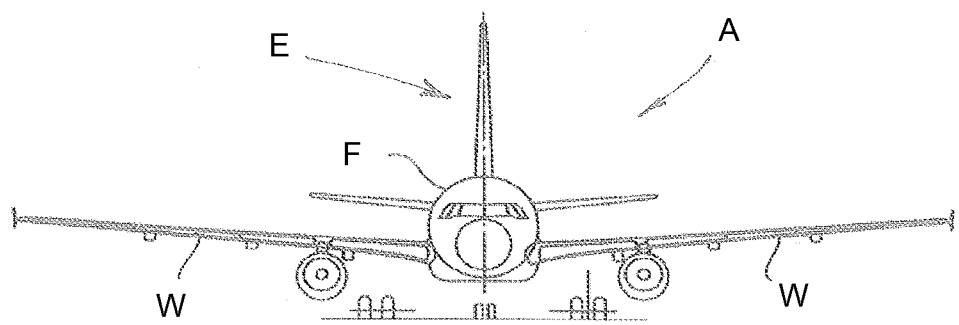
FIG. 7 is a schematic illustration of an aircraft having a fuselage or airframe structure that includes carbon fibre reinforced polymer components produced with a method and/or system according to the embodiment described herein.

Finally, with reference to FIG. 7, a schematic illustration of an aircraft (A) is shown having an airframe which includes a fuselage (F), wings (W), and an empennage (E). The airframe of the aircraft (A) incorporates one or more component (C) formed by a system 1 and/or a method according to an embodiment, for example, as described above with reference to FIGS. 1 to 6.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The terms "comprise", "comprising", "include", "including", "contain", "containing", "have", "having", and any variations thereof, are intended to be understood in an inclusive (i.e. non-exclusive) sense, such that the process, method, device, system or system described herein is not limited to those features or parts or elements or steps recited but may include other elements, features, parts or steps not expressly listed or inherent to such process, method, article, or system. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiments as set forth in the appended claims and their legal equivalents.

What is claimed is:

1. A method of producing a component of composite material, comprising:
    winding an elongate sheet of composite material about a winding axis which is offset by an angle from being perpendicular to a longitudinal axis of the elongate sheet so as to wind the sheet into a helical coil;
    drawing or conveying the helical coil of wound sheet along a process path that is parallel to the winding axis; and
    forming the coil of wound sheet as it is drawn or conveyed along the process path, wherein forming the coil of wound sheet includes pressing the wound sheet in a moulding tool,
    wherein the moulding tool is configured to hold a section of the wound sheet and to draw the coil of wound sheet along the process path.

2. The method of claim 1, further comprising at least partially curing the wound sheet after it has been formed, wherein the curing occurs in the moulding tool and at a temperature in the range of 60° C. to 200° C.

3. The method of claim 2, wherein the curing occurs at a temperature in the range of 100° C. to 180° C.

4. The method of claim 3, wherein the curing occurs at a temperature in the range of 120° C. to 160° C.

5. The method of claim 4, wherein the curing occurs at a temperature of 150° C.

6. The method of claim 1, wherein the component comprises an elongate or continuous component of fibre reinforced polymer.

7. The method of claim 1, further comprising:
    providing the elongate sheet of composite material on a roll; and
    drawing the elongate sheet from the roll in a direction of its longitudinal axis towards the winding axis.

8. The method of claim 1, further comprising:
    wrapping the coil of wound sheet with a support sheet as it is drawn or conveyed along the process path,
    the support sheet including reinforcing fibres that are arranged to extend either parallel to the process path or at an acute angle to the process path, and
    the support sheet comprising one of a fibre-reinforced polymer film and a composite prepreg.

9. The method of claim 8, wherein the fibre-reinforced polymer film is a release film.

10. The method of claim 8, further comprising:
    providing a roll of said support sheet and arranging the roll such that a central axis of the roll extends perpendicular to the process path along which the wound sheet is conveyed.

11. A system for producing components of composite material, comprising:
    a winding mechanism for winding an elongate sheet of composite material about a winding axis that is at an angle from being perpendicular to a longitudinal axis of the elongate sheet so as to form a helical coil of wound sheet;
    a drawing mechanism for conveying the helical coil of wound sheet along a process path, wherein the process path is parallel to the winding axis; and
    a shaping mechanism for forming the coil of wound sheet as it is drawn or conveyed along the process path, wherein the shaping mechanism includes a moulding tool that is movable between an open position for receiving the coil and a closed position for shaping the coil, wherein the moulding tool is movable to draw the coil along the process path, such that the moulding tool forms a part of the drawing or conveying mechanism.

12. The system according to claim 11, wherein the moulding tool comprises a plurality of mould parts configured to clamp and/or press the coil of wound sheet between them to form the predetermined cross-section or profile.

13. The system according to claim 11, further comprising a film applicator device configured to apply a film layer from a film roll to at least one side of the coil of wound sheet, wherein the film layer forms a release film to assist removal of the semi-finished product from the moulding tool.

* * * * *